Oct. 19, 1937.    W. V. JOHNSON    2,096,458
ADJUSTABLE SPEED MOTOR
Filed June 17, 1936
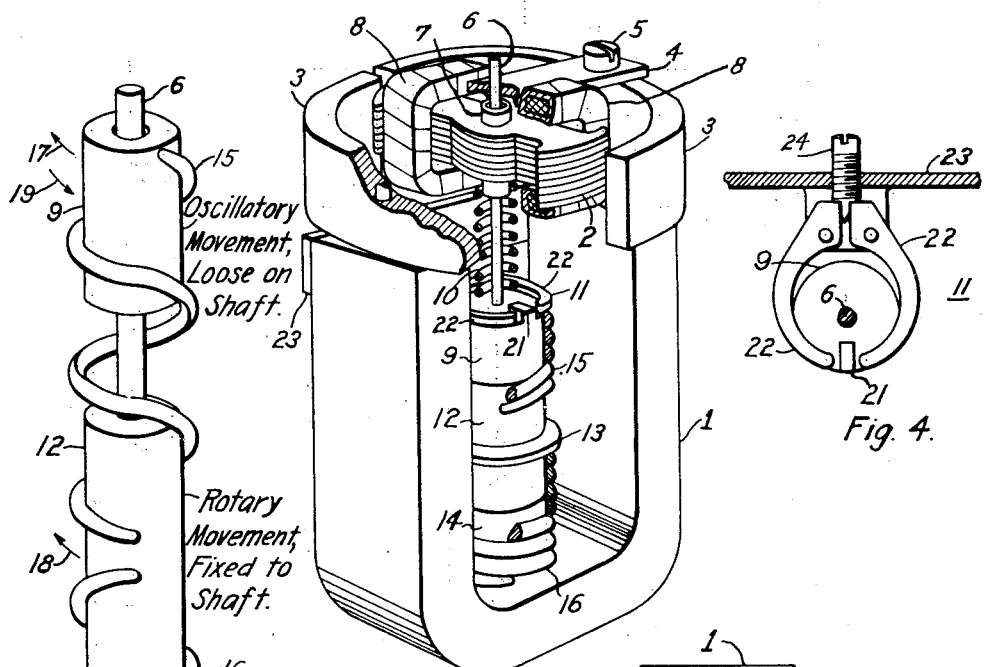
Fig. 1.
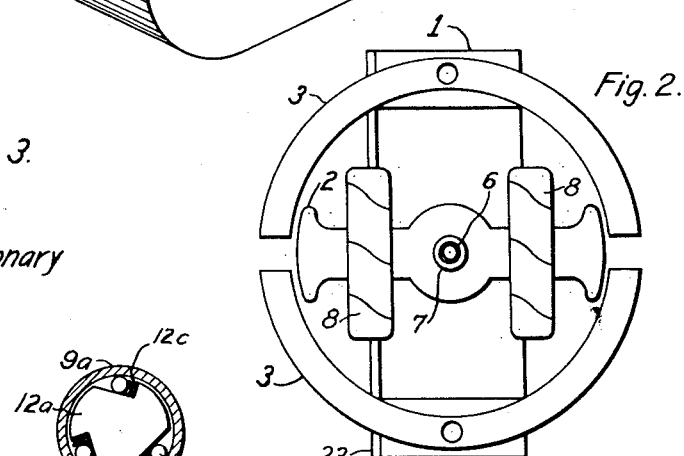
Fig. 4.
Fig. 2.
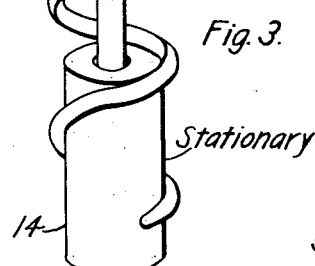
Fig. 3.
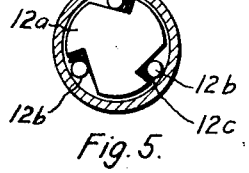
Fig. 5.
WITNESSES:
Wm. B. Sellers.
C. O. Harrison
INVENTOR
Welton. V. Johnson.
BY
ATTORNEY Patented Oct. 19, 1937

2,096,458

UNITED STATES PATENT OFFICE 2,096,458

ADJUSTABLE SPEED MOTOR

Welton V. Johnson, East Orange, N. J., assignor to Westinghouse Electric & Manufacturing Company, East Pittsburgh, Pa., a corporation of Pennsylvania Application June 17, 1936, Serial No. 85,635

4 Claims. (Cl. 172—126)

My invention relates to alternating-current electric motors and particularly to adjustable speed motors suitable for use as timing devices for relays, measuring devices and similar apparatus requiring accurately timed displacement at low mechanical loads. Although not limited thereto, my invention has particular application to apparatus of this type in which adjustment of motor speed through a wide range of values in infinitely fine gradations is required.

It is an object of the present invention to provide a novel adjustable speed timing motor having a starting transient of negligible duration, so that the speed corresponding to the adjustment can be secured almost instantaneously upon energization of the motor.

Other objects of my invention will become evident from the following detailed description taken in conjunction with the accompanying drawing, in which:

Figure 1 is a view in perspective of a motor embodying my invention, with parts broken away to show internal construction.

Fig. 2 is a plan view of the motor shown in Fig. 1, with the cover plate removed.

Fig. 3 is a diagrammatic expanded view in perspective, illustrating the operation of the ratcheting mechanism of the motor shown in Fig. 1.

Fig. 4 is a detail plan view of an adjusting device used in the motor shown in Fig. 1.

Fig. 5 is a plan sectional view of a modified clutch mechanism which may be used in the practice of the invention.

In accordance with the principle of my invention, a dynamo-electric motive device is arranged to produce oscillatory movement of an oscillatory member, within an adjustable range of amplitudes, and the movement of the oscillatory member is translated by means of uni-directional clutch mechanism to motion of an output member in one direction. Although there are various mechanical arrangements in which the invention may be embodied, I preferably utilize a dynamo electric motive device which produces angular oscillatory movement, and provide an oscillatory member and an output member in the form of cylinders or drums mounted coaxially with the armature of the motive device. However, the details of construction of the preferred embodiment of my invention may better be understood by reference to the drawing.

Referring to Figs. 1 and 2 of the drawing, in detail, the dynamo-electric motive device comprises a U-shaped permanent magnet 1 which serves as a source of field flux for a vibratory armature assembly 2 and also serves as a frame or support for other elements of the structure. The magnet 1 is machined across its free ends to provide a plane surface for the seating of a pair of arcuate pole tips 3, of suitable ferro-magnetic material such as soft iron which are welded or otherwise suitably secured to the magnet 1. A metal strap 4 is provided for attachment to the pole tips 3, and may be secured thereto by any suitable means, such as bolts, one of which is shown at 5.

The metal strap 4 and the central portion of the magnet, are drilled to receive a shaft 6, which serves to drive the motor load (not shown).

The armature assembly 2 of the motive device comprises a number of steel laminations pressed on a hub 7, the latter having sufficient internal diameter to provide a running fit on the shaft 6. The outer ends of the armature assembly 2 are shaped to provide arcuate pole portions which normally lie opposite the air gaps between the pole tips 3, as best shown in Fig. 2.

It will be noted that the armature assembly 2 is mounted for rotary movement about the axis of shaft 6, and may be considered as a pair of pole portions symmetrically disposed about the axis and having a magnetic connection between the pole portions. Similarly, the magnet 1 and pole tips 3 may be considered as a stationary field structure having a pair of field poles symmetrically disposed about the axis of shaft 6, and having a magnetic connection (through the magnet 1) between the field poles, external to the armature assembly. The energizing windings are interlinked with one of the above-mentioned magnetic connections. In the preferred embodiment of the invention, the energizing windings 8 are secured to the metal strap 4 by any suitable means (not shown) in positions to surround the armature assembly 2 and permit a limited oscillatory movement of the latter.

The oscillatory member of my invention is preferably a free-running drum 9, mounted for free oscillatory movement on the shaft 6, and resiliently coupled to the armature assembly 2 by means of a coupling spring 10. An adjusting device 11 is provided for limiting the angular movement of the drum 9 to an adjustable range, ordinarily less than the total angular movement of the armature assembly 2.

The output member of the invention is preferably also a cylinder or drum 12, secured to the shaft 6, for rotation therewith, just below the free-running drum 9, in Fig. 1. The rotating drum 12 is preferably provided with an integral flange 13 at its central portion, which serves to separate the two clutching springs to be hereinafter described.

A stationary drum 14, drilled to receive the shaft 6 and arranged to permit free rotation of the latter, is rigidly secured to the permanent magnet 1. The three drums 9, 12 and 14 are cylindrical in form and are carefully ground so that adjacent surfaces have the same external diameter. For simplicity it will be assumed that the drums 9, 12 and 14 are all of the same external diameter.

A spiral clutching spring 15, having its internal surface ground and lapped to cylindrical form of slightly less internal diameter than the external diameter of the free-running drum 9, is sprung over the latter and the upper portion of the rotating drum 12. A similar clutching spring 16, but wound in the opposite spiral direction, is sprung over the stationary drum 14 and the lower portion of the rotating drum 12. The clutching springs 15 and 16 are each free at both ends and may assume any angular position with reference to the drums 9, 12 or 14.

The drums 9, 12 and 14 and the springs 15 and 16 constitute a unidirectional clutch mechanism in which the drum 9 imparts forward movement to the drum 12 in a manner to be hereinafter described, and the drum 14 and spring 16 operate as a friction brake to prevent backward movement of the drum 12. Obviously, the drum 14 and spring 16 may be replaced by any other suitable friction brake serving to impede or arrest backward rotation of the drum 12. Alternatively the entire unidirectional clutch mechanism may be replaced by other equivalent clutch devices, one of which is shown in Fig. 5.

The operation of the apparatus shown in Figs. 1 to 4 may be set forth as follows: The windings 8 are connected to an alternating-current source in such relative directions as to produce magnetomotive forces having the same instantaneous direction in space. The magnetomotive forces produced by the windings 8 establish an alternating field in the armature assembly 2 which causes the latter to oscillate angularly in the field of the permanent magnet 1, at the rate of one complete oscillation per cycle of the alternating-current source. Inasmuch as the magnetic action involved in such oscillation is well understood in the art, it will not be described in detail.

The cylinders 9, 12 and 14 and the clutching springs 15 and 16 cooperate to translate the oscillatory motion of the free running drum 9 to rotation of the rotating drum 12 in a manner which may be understood by reference to Fig. 3.

When the oscillatory or free-running drum 9 rotates in the direction indicated by arrow 17, the upper coupling spring 15 is distorted in such direction that its coils become of smaller diameter, thereby binding the rotating drum 12 to the free-running drum 9. At the same time, the motion of the rotating drum 12 partially unwinds the lower coupling spring 16, causing its coils to become of larger diameter, thereby freeing the rotating drum 12 from the stationary drum 14. The rotating drum 12 accordingly rotates slightly in the direction indicated by arrow 18.

At the limit of oscillatory movement of the free-running drum 9, its direction of motion reverses, and it commences to move in the direction of arrow 19. During this movement of the free-running drum 9, the upper clutching spring 15 is partially unwound so that the free-running drum 9 is released from the rotating drum 12, and slips in the opposite direction with reference thereto. At the same time the lower clutching spring 16 is distorted so as to bind the rotating drum 12 to the stationary drum 14. The rotating drum 12 accordingly remains stationary during this half cycle of oscillation of the free-running drum 9. It will be seen that the oscillatory motion of the free-running drum 9 is translated to step-by-step unidirectional rotation of the rotating drum 12 and shaft 6.

The friction of the shaft 6 in its bearings tends to prevent the drum 12 from overrunning at the end of each forward movement. In some applications, particularly where the motor is connected to drive a mechanical load of high inertia, the friction of the bearings may not be sufficient to properly arrest the drums 12, and in such cases external friction means may be provided for supplementing the drag of the bearings.

The mechanism for adjustably limiting the oscillatory movement of the free-running drum 9 is shown in elevation in Fig. 4. In this figure, a lug 21, which may be integral with the free-running drum 9, extends between the free ends of a pair of caliper arms 22, preferably of phenolic condensation product, because of the low level of contact noise produced by such material. The caliper arms 22 are rotatably secured to a suitable stationary support 23, in such manner as to provide an adjustable angular range of movement for the lug 21. A machine screw 24 having a conical point, or other suitable adjusting device, is provided for adjustably separating the caliper arms 22.

It will be noted that the movement of the lug 21 can be limited to a comparatively small part of the total angular swing of armature assembly 2, so that full movement of the lug 21 between the caliper arms 22 can be established during the first cycle of applied alternating current, even though the armature assembly 2 may not rotate through its entire angular range of movement during the initial cycle. In this way the starting transient of the electromagnetic system is substantially eliminated as a factor affecting the speed or acceleration of the motor shaft 6.

In the arrangement shown in Fig. 5, the oscillatory drum 9a, corresponding to the drum 9 of Fig. 1, is made in hollow cylindrical form to surround the driver member 12a, corresponding to the drum 12 of Fig. 1. The driver member 12a is recessed to receive a plurality of balls or rollers 12b, which are outwardly biased against the drum 9a by means of suitable springs 12c. The operation of this modification will be obvious.

I do not intend that the present invention shall be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. An adjustable speed motor comprising an oscillatory member, dynamo-electric means for producing oscillatory movement of said member, means for adjustably limiting the amplitude of oscillation of said member, an output member, and unidirectional clutch means connecting said oscillatory member to said output member to produce unidirectional movement of said output member, during each cycle of oscillation of said oscillatory member, proportional to the amplitude of oscillation of said oscillatory member.

2. An adjustable speed motor comprising a cylindrical member mounted for oscillatory movement about its axis, dynamo-electric means for producing oscillatory movement of said member, an output member mounted for rotation co-axially with said cylindrical member, said output member having a cylindrical portion of substantially the same diameter as said cylindrical member, and a spiral spring surrounding said cylindrial member and said cylindrical portion, for translating oscillatory movement of said cylindrical member to rotary movement of said output member.

3. An adjustable speed motor comprising a cylindrical member mounted for oscillatory movement about its axis, dynamo-electric means for producing oscillatory movement of said member, a stationary cylinder co-axial with said cylindrical member, an output member mounted for rotation co-axially with said cylindrical member, said output member having a cylindrical portion of substantially the same diameter as said cylindrical member and having a cylindrical surface of substantially the same diameter as said stationary cylinder, a spiral clutching spring surrounding said cylindrical member and said cylindrical portion, and a spiral clutching spring, wound in opposite direction to said first mentioned spring, surrounding said cylindrical surface and said stationary cylinder.

4. An adjustable speed motor comprising an oscillatory member mounted for oscillatory movement about an axis, said member having a clutch surface in the form of a surface of revolution generated about said axis, dynamo-electric means for producing oscillatory movement of said member, means for adjustably limiting the amplitude of oscillation of said member, an output member mounted for rotation co-axially with said oscillatory member, said output member having a clutch surface in the form of a surface of revolution generated about said axis, and a spiral spring closely conforming to said clutch surfaces and surrounding the same for translating oscillatory movement of said oscillatory member to rotary movement of said output member.

WELTON V. JOHNSON.